US005606898A

United States Patent [19]

Franciskovich et al.

[11] Patent Number: 5,606,898

[45] Date of Patent: Mar. 4, 1997

[54] ANGULARLY ACCESSIBLE HEAD FOR THREADED CONNECTOR AND COOPERATING TOOL

[76] Inventors: Mark Franciskovich, 2434 Park Ave., North Riverside, Ill. 60546; Steve A. Masnjak, 41 W. 861 High Point La., Elburn, Ill. 60119

[21] Appl. No.: 447,616

[22] Filed: May 23, 1995

[51] Int. Cl.[6] .......... B25B 15/00

[52] U.S. Cl. .......... 81/436; 81/176.15; 411/405; 411/919

[58] Field of Search .......... 411/402–405, 919; 81/176.15, 436

[56] References Cited

U.S. PATENT DOCUMENTS

| | | | |
|---|---|---|---|
| 172,351 | 1/1876 | Sloan | 411/403 |
| 1,997,422 | 4/1935 | Lornzen et al. | 411/403 |
| 2,750,974 | 6/1956 | Hart | 81/436 |
| 3,236,141 | 2/1966 | Smith | 411/405 X |
| 3,405,748 | 10/1968 | Sorteberg | 81/436 |
| 3,675,694 | 7/1972 | Barlow | 411/403 X |
| 4,584,914 | 4/1986 | Hall et al. | 81/716.15 |

*Primary Examiner*—James G. Smith
*Attorney, Agent, or Firm*—Kajane McManus

[57] ABSTRACT

The angularly accessible head for a threaded connector comprises a spherical structure having a centered slot therein, the slot having a bottom surface or wall in the shape of an inverted V, with a point thereof extending toward the center of the sphere. The cooperating tool includes a hollow cylindrical head portion having an open end, the open end being defined by opposed plateau areas in one plane and opposed cusp areas in a transverse plane, with a rod extending across the open end between the plateau areas.

10 Claims, 2 Drawing Sheets

24
10
22
12
20

ANGULARLY ACCESSIBLE HEAD FOR THREADED CONNECTOR AND COOPERATING TOOL

BACKGROUND OF THE INVENTION

1. Field of the Invention

The present invention relates to an angularly accessible head for a threaded connector such as a screw or bolt and to a tool for use in manipulating the head of the connector.

2. Prior Art

Heretofore, threaded connectors have required placement in such a manner that a tool for use in manipulating same must lie in the same plane as the connector.

For instance, a screwdriver must be coplanar with the slot for same in the screw head to operate efficiently in manipulating the screw. Likewise, a socket for use in tightening a bolt must be coplanar to engage the polygonal circumference of the bolt for manipulation.

Such required alignment can cause problems, such as when a tool cannot be aligned appropriately due to lack of space. This is a particular problem in vehicles, such as when one wishes to remove a hose clamp but cannot access the screw head, often requiring the clamp to be mangled for removal.

SUMMARY OF THE INVENTION

Accordingly, it is a primary object of the invention to provide a connector head which is accessible at an angle thereto for manipulation.

Further it is an object to provide a tool for use in angularly accessing and manipulating the connector head.

DESCRIPTION OF THE PREFERRED EMBODIMENT

Figure 1:
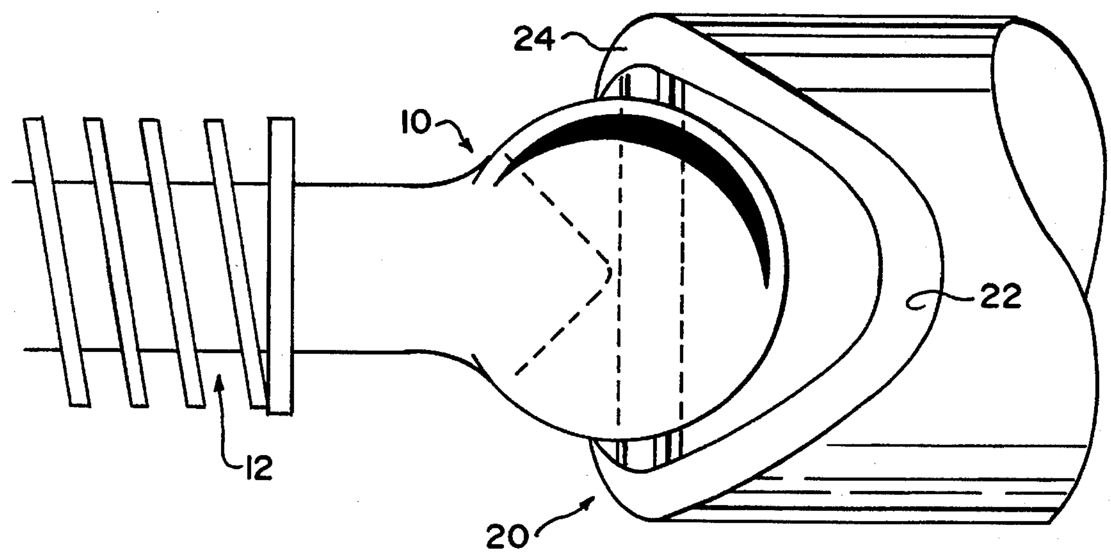
FIG. 1 is a side view of the connector head of the present invention shown engaged to a tool for manipulating the head, the tool also being made according to the teachings of the present invention.

Referring now to the drawings in greater detail, there is illustrated in FIG. 1 a connector head 10 made in accordance with the teachings of the present invention. The head 10 is proposed for use on any threaded connector 12 which requires a rotational manipulation for activation.

There is also illustrated in FIG. 1 a head portion 14 of a tool 15 proposed for use in manipulating the connector head 10. Only the head portion 14 of a tool is disclosed because the head portion 14 may be created as a socket or may be integrally formed with a handle extending therefrom.

Figure 2:
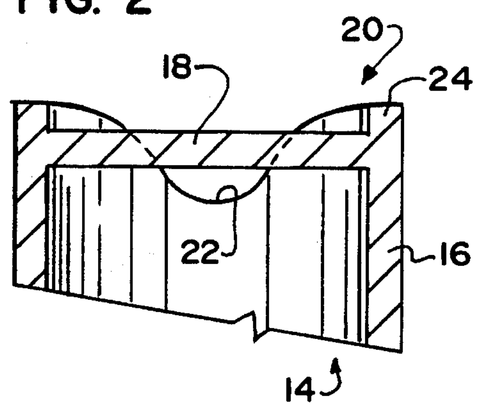
FIG. 2 is a cross section through the tool and is taken along line 2—2 of FIG. 1.
Figure 3:
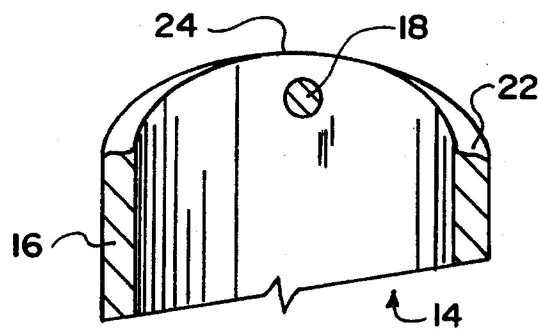
FIG. 3 is a cross section through the tool in a plane transverse to that of FIG. 2.

Turning now to FIGS. 2 and 3, it will be seen that the head portion 14 of the tool is in the form of a hollow cylinder 16 having a circular in cross section cross member or bar 18 extending centrally across an open end 20 of the head portion 14. The open end 20 has a configuration which includes two sloping or cusp areas 22 juxtaposed to two plateau like areas 24, the rod 18 extending between the opposite plateau like areas 24, and being slightly inset therefrom.

It will be seen from FIG. 1, that the cusp areas 22 mimic the shape of the connector head 10 when the bar 18 of the tool head portion 14 is engaged within a slot 26 provided in the connector head 10. Such mimicry allows for relative pivotability between the connector head 10 and the tool head portion 14, as will be defined in greater detail hereinafter.

It will be understood also that the diameter of the tool head portion 14 must be slightly greater than the diameter of the spherical connector head 10, to allow for relatively pivotable engagement therebetween as shown.

Figure 4:
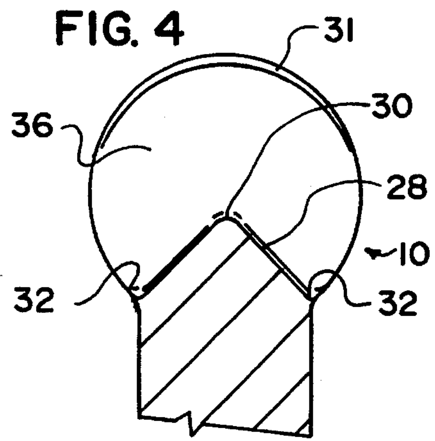
FIG. 4 is a cross section through the connector head and is taken along line 4—4 of FIG. 1.
Figure 5:
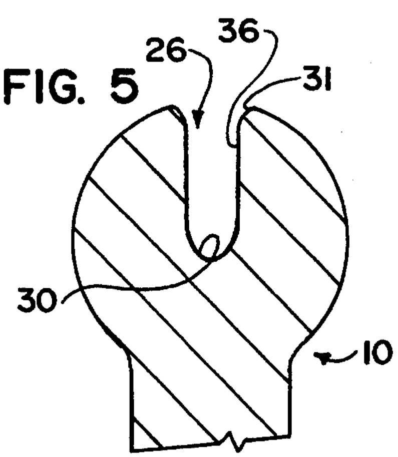
FIG. 5 is a cross section through the connector head in a plane transverse to that of FIG. 4.

Turning now to FIGS. 4 and 5, there is shown therein the connector head 10 in cross section through the slot 26. As illustrated, the head 10 includes the slot 26 which is centered across the head 10 and has an inverted V shaped base or bottom wall 28, with a tip or point 30 of the wall 28 being approximately centered within the circular cross section of the head 10.

The external edges 31 of the slot 26 are chamfered, as is each external edge 32 of the bottom wall 28. Chamfering of the edges provides for smoothly flowing motion between the head 10 and tool head portion 14.

The required configuration proposed for the connector head 10 and tool head portion 14 can best be described through study of the relative motion therebetween.

Figure 6:
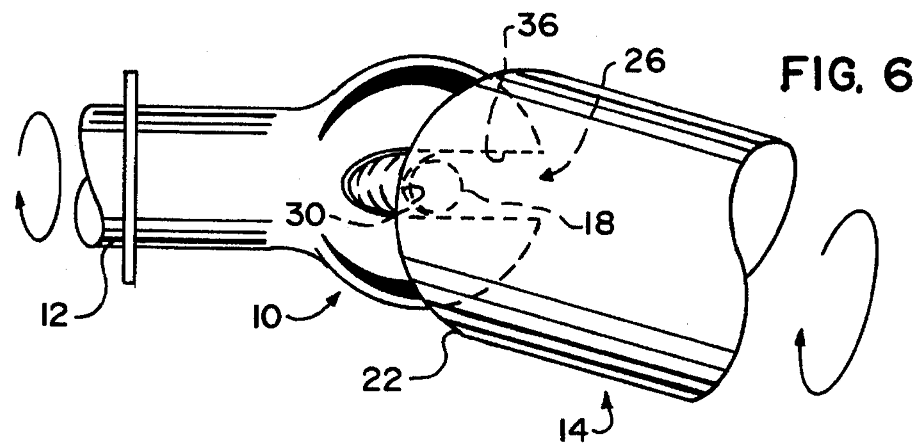
FIG. 6–8 show the relative relationship between the connector head and tool through approximately one turn, with FIG. 8 showing maximum angulation between the two components.
Figure 7:
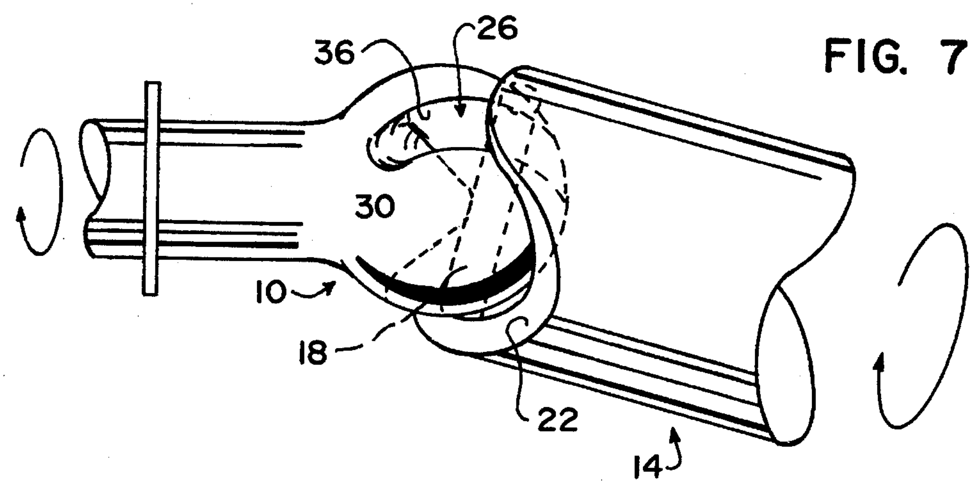
Figure 8:
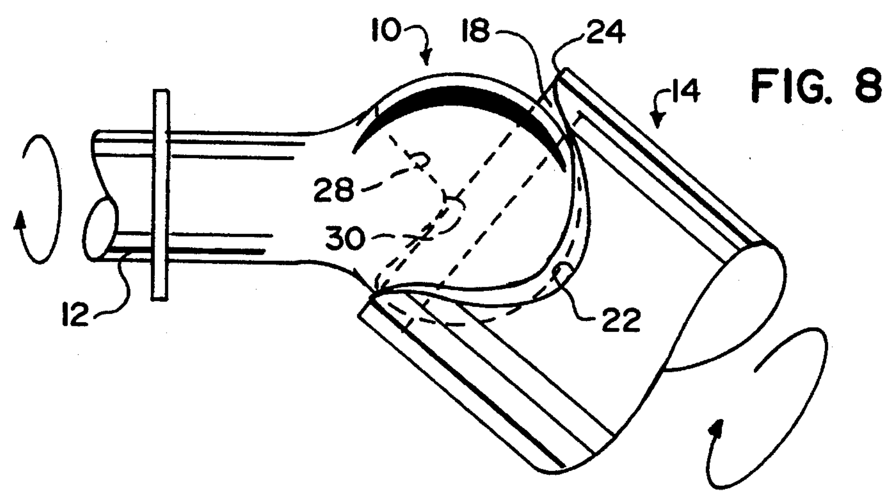

Such relative motion is depicted in FIGS. 6–8.

In FIG. 6, the bar 18 of the tool head portion 14 is seen seated within the slot 26 with the bar 18 resting against the point 30 of the bottom wall 28 of the slot 26. It will further be seen that the tool head portion 14 is not in coplanar relationship with the connector head 10 but is rather angled relative thereto, with one cusp area 22 accommodating the greater diameter of the spherical head 10 therein to a greater extent than the other juxtaposed cusp area 22. Thus, the bar 18 serves as a pivot about which the tool head portion 14 can be angled in relation to the head 10 of the connector 12.

Further, because of the ramped configuration of the bottom wall 28 of the slot 26, taken together with the configuration of the tool head portion 14 as defined above, and with a view of FIG. 7, it will be seen that the angular relation between the connector head 10 and tool head portion 14 can also be varied on an axis transverse to the axis of the rod 18. Thus, a "side-to-side" rocking motion of the tool head portion 14 can be achieved as well as the bar 18 alternately rides along each diverging ramp of the bottom wall 28 of the slot 26 in the connector head 10.

With the pivotability attained by the relative angulation, the connector head 10 can be manipulated for activation of the connector 12 from an angular access point which is maximized by the slope of the bottom surface 28 of the slot 26, as shown in FIG. 8.

It will be understood that during manipulation, activation of the connector 12 is accomplished by an abutment created between the rod 18 and either side wall surface 36 defining the slot 26, in similar manner that screw activation is accomplished with a screw driver.

Accordingly, a circular in cross section connector head 10 is proposed to maximize abutment surface availability during maximum angled relation between the connector head 10 and rod 18 of the tool head portion 14, as shown in FIG. 8.

By providing the point 30 at a position slightly off center within the connector head 10, it is believed that the rod 18, will, for the most part, lie substantially across the fullest diameter of the circular cross section defining each wall 36 of the slot 26, affording the greatest degree of rotational torque per turn of the tool head portion 14.

Through empirical testing, it has been found that an angulation of approximately 45° from the axis of the connector 12 can be accommodated for angulation of the surface 28 and an angulation of up to approximately 90° can be accommodated about the rod 18 relative to the axis of the connector 12.

As described above, the connector head 10 and cooperating tool head portion 14 provide a number of advantages, some of which have been described above and others of which are inherent in the invention. Also, modifications of the components may be proposed without departing from the teachings herein. For example, a screwdriver could be used to manipulate the connector head 10 and the tool head portion 14 could conceivably be used to tighten a screw having an appropriately dimensioned slot. Further, it is known to provide tool head portions which are magnetized. Accordingly the scope of the invention is only to be limited as necessitated by the accompanying claims.

We claim:

1. A tool head portion for manipulating an angularly accessible head for a threaded connector, the head comprising a spherical member having a centered slot therein, the slot extending toward the connector and having a bottom wall in the form of an inverted V, a point of the V being directed toward a center point of the spherical member, and the slot further having substantially planar circular side walls, the tool head portion comprising a hollow cylindrical member having an open end, the open end being defined by opposed plateau areas in one plane and opposed cusp areas in a transverse plane, with a rod extending across the end between the plateau areas.

2. The tool head portion of claim 1 wherein said rod is circular in cross section.

3. The tool head portion of claim 2 wherein said rod is slightly inset into the tool head portion.

4. In combination, an angularly accessible head for a threaded connector and a cooperating tool head portion, the connector head comprising head for a threaded connector, the head comprising a spherical member having a centered slot therein, the slot extending toward the connector and having a bottom wall in the form of an inverted V, a point of the V being directed toward a center point of the spherical member, and the slot further having substantially planar circular side walls and the cooperating tool head portion comprising a hollow cylinder having an open end, the open end being defined by opposed plateau areas in one plane and opposed cusp areas in a transverse plane, with a rod extending across the end between the plateau areas the rod of the tool head portion being engageable within the slot and causing turning of the connector head by abutting against side walls of the slot and rocking side to side within the slot by riding along and pivoting about the V shaped bottom wall, with the tool head portion further pivoting about the rod within the slot to an extent allowed by the cusp areas of the tool head portion relative to the spherical extent of the connector head.

5. The head of claim 4 wherein said bottom wall is defined by two diverging slopes.

6. The head of claim 5 wherein the slopes diverge at an approximately 90° angle.

7. The head of claim 6 wherein the point of the bottom wall extends to a point of the bottom wall extends to a point just short of the center of the side walls of the slot.

8. The head of claim 7 wherein the edges of the slot are chamfered.

9. The tool head portion of claim 8 wherein said rod is circular in cross section.

10. The tool head portion of claim 9 wherein said rod is slightly inset into the tool head portion.

* * * * *